J. L. CULKIN.
SHOCK FORMING AND MAKING MACHINE.
APPLICATION FILED MAY 16, 1918.

1,361,307.

Patented Dec. 7, 1920.
3 SHEETS—SHEET 1.

Fig. 1.

Inventor
John L. Culkin.
Atty.

J. L. CULKIN.
SHOCK FORMING AND MAKING MACHINE.
APPLICATION FILED MAY 16, 1918.

1,361,307.

Patented Dec. 7, 1920.

Inventor
John L. Culkin.
Atty.

UNITED STATES PATENT OFFICE.

JOHN L. CULKIN, OF CHATSWORTH, ILLINOIS.

SHOCK FORMING AND MAKING MACHINE.

1,361,307.     Specification of Letters Patent.     Patented Dec. 7, 1920.

Application filed May 16, 1918. Serial No. 234,948.

*To all whom it may concern:*

Be it known that I, JOHN L. CULKIN, a citizen of the United States, and a resident of Chatsworth, in the county of Livingston and State of Illinois, have invented certain new and useful Improvements in Shock Forming and Making Machines, of which the following is a full, clear, and exact description, reference being had to the accompanying drawings, forming part of this specification.

My invention relates more particularly to machines which are in the nature of attachments and which may be used in connection with binders or similar machinery.

One object of my invention is to so arrange and organize the machine that it will receive and properly handle the sheaves of grain, when the latter are delivered from the binder and carry these sheaves and collect them into a shock.

Another object of my invention is the provision of suitable mechanism whereby, when a shock has been formed of a quantity of sheaves as previously described, the latter may be handled as a unit, and properly deposited upon the ground.

Another object of my invention is the provision of suitable means whereby a cap sheaf may be applied to the shock before the latter is deposited on the ground.

Another object of my invention is the provision of means whereby the various functions of the mechanism may be properly controlled, and the proper sequence maintained.

Another object of my invention is the provision of manually controlled shock depositing mechanism whereby the shocks may be arranged on the field in windrows.

Another object of my invention is the provision of means whereby varying lengths of grain may be properly handled and the cap sheaf properly applied.

Other objects of my invention will appear and be described in the specification. The novelty of my invention will be hereinafter more fully set forth and specifically pointed out in the claims.

In the accompanying drawings.

The same numerals of reference are used to indicate identical parts in all the figures.

Broadly stated, the machine comprises a shock carrier, within which the sheaves are placed successively until the carrier has been filled to the required point, whereupon a crane mechanism becomes operative, its carrying members being so formed as to embrace the shock, whereupon the shock holding members are released and the shock is raised from the horizontal position, in which it was formed to a vertical position preparatory to its deposit upon the ground.

By manual control the operator sets the mechanism in motion which deposits the shock upon the ground, which again starts the shock forming mechanism into operation to place within the shock carrying members the next series of sheaves to form a shock.

As showing one form of mechanism wherein my invention may be embodied, I have shown in the drawings a machine comprising a frame, 1, which is provided with a supporting wheel 2, the latter being provided with a sprocket, 3, by means of which the necessary power to operate the various parts of the machine is transmitted to these parts.

Other supporting wheels, such as the caster wheel 4, may be employed where the size or arrangement of the mechanism renders this desirable.

A sprocket chain 5, passes from the sprocket 3, to the sprocket 6, mounted on the shaft 7, the latter extending across the forward part of the machine and being mounted upon the frame 1.

The sprocket 6, through connections to be later described, and at proper intervals, furnishes the necessary power to operate the shafts 8 and 9, which lie parallel to and near the shaft 7, the sprocket 6, also, through the medium of the chain 10, and its sprockets, operates the shaft 11, this latter, and the shaft previously described, furnishing all of the driving elements necessary for the proper operation of the various parts.

Figure 2:
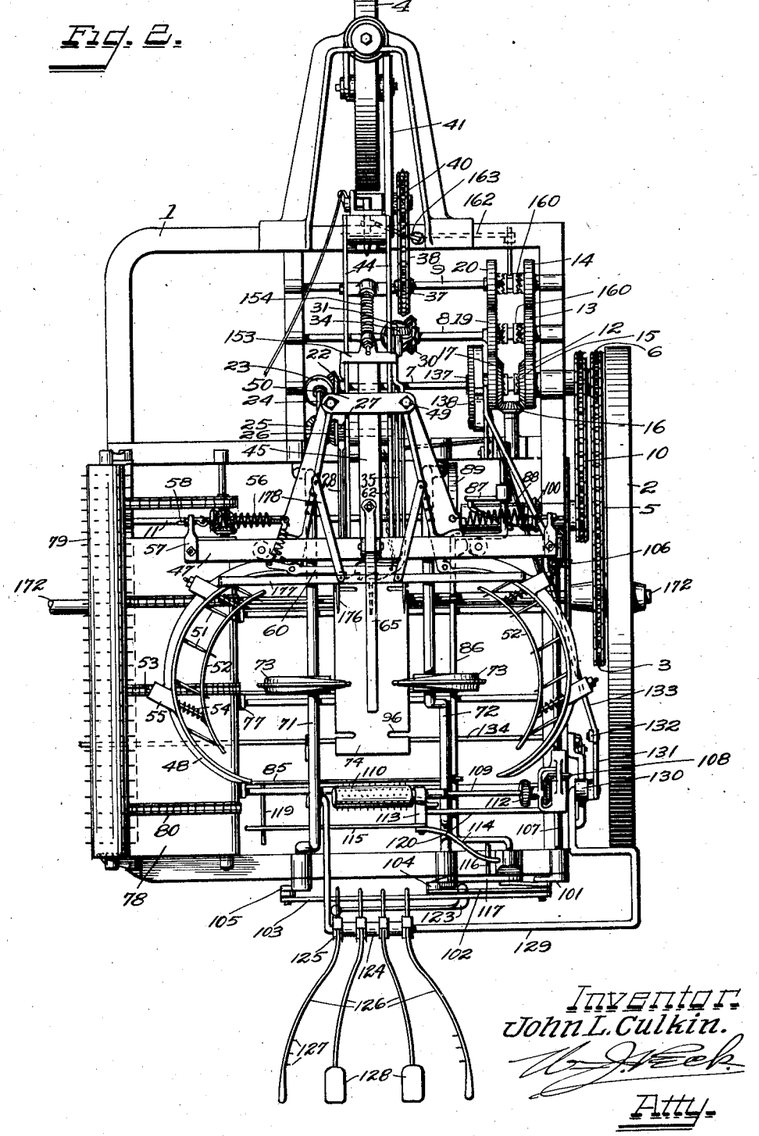
Fig. 2, Sheet 2, is a plan view of Fig. 1.

As shown more clearly in Fig. 2, the shafts 7, 8, and 9 are each provided with a pair of driving gears, the gear 12 being connected by a sleeve to the sprocket 6, the gear 12 meshing with and driving a gear 13 on the shaft 8, the gear 13 meshing with and driving a gear 14 on shaft 9. The gear 12 carries a gear 15, which meshes with a pinion 16, the latter meshing with a gear 17, which is carried by gear 18 on the shaft 7, the gears 17 and 18 being similar to the gears 15 and 12 previously described. The gear 18 drives a gear 19 on the shaft 8, which in turn drives a gear 20 on the shaft 9.

It will be seen from the above that each of the shafts 7, 8, and 9 is provided with a pair of gears driven from the ground wheel 2, these gears running in opposite directions on each shaft, and each being provided with clutch-jaws, which are adapted to be engaged by clutch members 160 splined on the shafts 7, 8, and 9 and adapted to be alternately engaged with either of the gears thereon.

The shaft 7, carries a bevel-gear 22 meshing with the bevel-gear 23 carried on the lower end of the telescoping shaft 24, the upper end of this shaft carrying a bevel gear 25, which meshes with and drives the bevel-gear 26. The gear 26 carries a spur pinion 27, which engages a quadrant 28 in such manner that when the pinion 27 is rotating in one direction the quadrant is moved from the position shown in Figs. 1 and 2 to a position approximately at right angles to the position shown, and that when the pinion 27 is rotated in the opposite direction, the quadrant 28 is returned to its position, as shown in the drawings.

In order to facilitate the operation of the device the bevel gear 26 and spur pinion 27 are preferably mounted on anti-friction bearings, the same being carried in the hub of the gears and mounted upon the trunnion 29.

The shaft 8 carries a bevel gear 30, which meshes with a similar gear 31 (as more clearly shown in Fig. 1), the latter being mounted on the lower end of a vertically arranged shaft 32, the upper end of which carries a convex faced gear 33, which meshes with a similar gear 34 on a horizontal shaft 35, the latter carrying a drum or cylinder 36.

Figure 1:
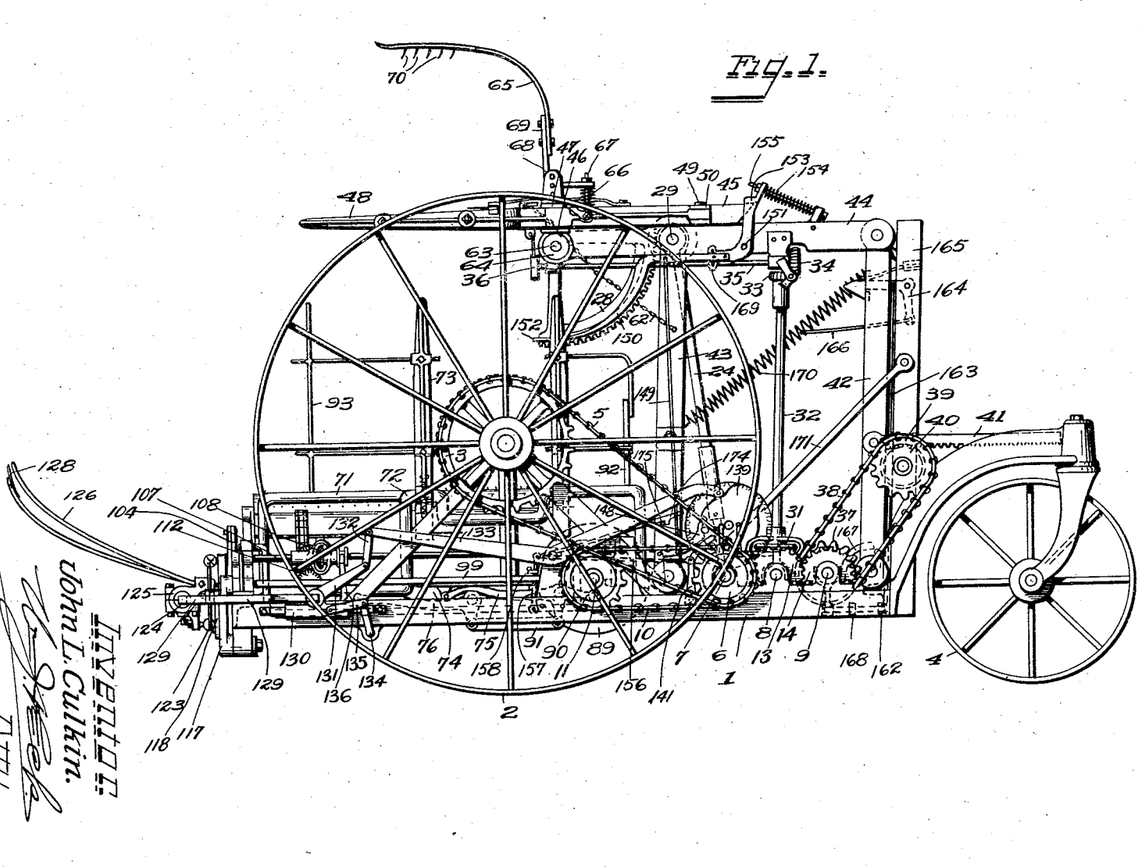
Figure 1, Sheet 1, is a side elevation of a completely organized machine, the parts being shown in proper position at the commencement of a cycle of operation.

The shaft 9 carries a sprocket 37, which, through the chain 38, drives a similar sprocket 39, which carries a spur pinion 40, the latter engaging the rack 41, which is connected to a standard 42, the construction and arrangement of the parts just described being such, that as the spur pinion 40 is operated counter-clockwise, when viewed from the position shown in Fig. 1, the upper end of the standard 42 will be moved to the left, and that when the pinion 41 is reversed, the standard 42 will be returned to the position shown.

A second standard 43 is mounted on the frame 1 to the rear of the standard 42 and a supporting member 44 is connected to the upper ends of both the standards 42 and 43 in such manner that when the standards are moved, the supporting piece travels rearwardly and downwardly, while maintaining a position parallel to the ground.

The rear end of the supporting member 44 carries the mechanism by which the shock is removed from the shock carrying members and disposed upon the ground, and this mechanism comprises the bar 45, to which the guides 46 and 47 are attached, the guides embracing the arms 48, which are connected as at 49, and through the medium of the plates 50, to the member 45.

The arms 48 are better shown in Fig. 2, where it will be seen that each carries a series of tines 51 and a stripper 52. The stripper 52 is mounted on the adjustment bolts 53, which are surrounded by cushion springs 54, partly lying within the pockets 55 of the arms 48, the stripper being provided with a perforation through which each tine 51 may extend in such manner that when material is grasped by the arms 48, the strippers will be forced to a position close to the arms 48, thus allowing the tines 51 to enter the material and prevent its longitudinal movement between the arms 48.

A coil spring 56 is attached to each of the arms 48, and extends to a bracket 57, which is mounted on the end of the guide 47, each spring being provided with means for adjustment as shown at 58. The springs just referred to serve to maintain the arms 48 in their open position as shown in Fig. 2, and to cause these arms to immediately assume this position when the closing and holding mechanism to be later described has performed its functions.

Figure 3:
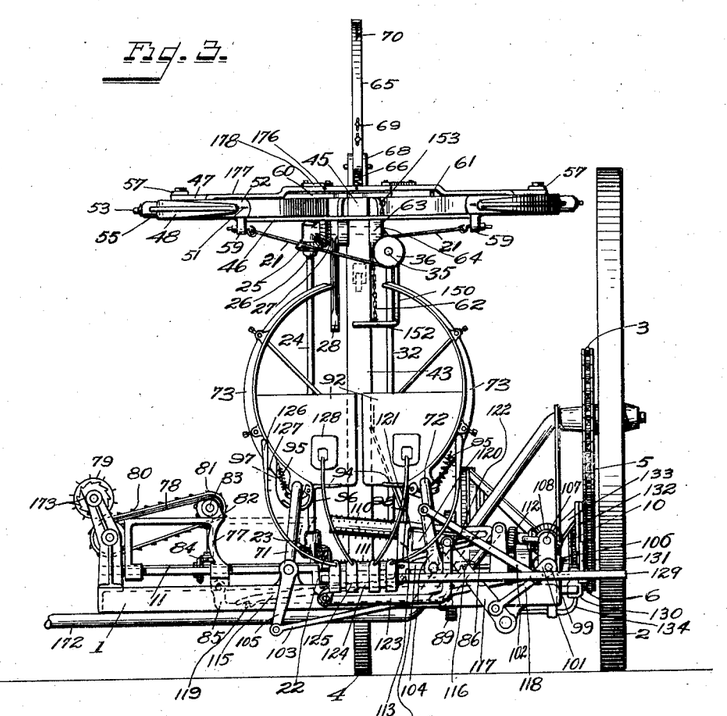
Fig. 3, Sheet 3, is a rear elevation of Fig. 1.

The drum 36, as shown clearly in Fig. 3, is provided with a pair of flexible members 21, such as wire cable, and these members are connected at their opposite ends to lugs 59 of the arms 48, the construction and arrangement of these parts being such that as the drum 36 is rotated in one direction the arms 48 are drawn toward each other, so that their rear curved ends form a circular holding device.

A latch 60, (see Fig. 2), is carried by one of the arms 48, and is adapted to engage a pin 61 carried by the other arm 48, when the arms are brought to their closed position, the latch 60 being connected as by means of the cord or cable 62, to some part of the mechanism in such a manner that when the standards 42 and 43 are operated to approximately the end of the travel downwardly and rearwardly, the latch 60 will be disengaged from the pin 61 whereupon the springs 56 immediately become effective to open the arms to the position shown in Fig. 2.

The quadrant 28 previously described, is connected to the member 45, so that as the quadrant is operated the member 45 moves from the position shown in Fig. 1, to a position at right angles thereto, the movement being effective around the trunnion 63, this trunnion through the medium of anti-friction bearings 64, serving as a support for the member 45 and the parts which it carries.

An adjustable cap sheaf holder 65 is mounted upon the member 45, and provided with a tension device 66 and adjusting bolt 67, the carrying brackets 68 being provided with a series of perforations, whereby the cap sheaf holder 65 may be further adjusted as to its position. A slide adjustment 69 may also be provided to afford a greater range of adjustability to the holder 65.

The cap sheaf engaging end of the holder 65 is provided with tines 70 to assist it in properly performing its functions.

A pair of crank shafts 71 and 72 are mounted upon the frame 1, and each carries a pair of shock carrying members 73, which are shown more clearly in Fig. 3, the shock carrying members 73 being located in pairs and adapted to receive between them the sheaves of grain which form the shock.

Located below the members 73 is an elevating member or packer 74 (Fig. 2) which is mounted upon the levers 75 and 76 Fig. 1, so that at proper intervals the packer is raised to introduce a sheaf into the shock carrying members 73.

A plurality of feeders 77 are mounted for reciprocating movement from the sheaf platform 78 to the packer 74 and a sheaf-alining-roller 79 is mounted above the sheaf platform at the receiving end thereof.

The sheaf-alining-roller 79 is preferably mounted, so as to be operated by the weight of the sheaves of grain, as they are discharged upon it from the knotting mechanism of the binder, though if preferred, this roller may be positively driven, the roller 79 being preferably provided with tines to prevent the sheaves from slipping and to assist in straightening them with relation to the sheaf carrying platform.

The sheaf carrying platform 78 is traversed by a plurality of drag chains 80, which may be provided with lugs or fingers 81 to insure the movement of the sheaves as the machinery operates, the fingers 81 serving the further purpose of delivering the sheaves to the feeders 77. The sheaf platform 78 is carried around the line of travel of the drag chains 80 and is then extended outwardly to strip the sheaves from the fingers of the chains 80, as shown at 82 Fig. 3, to insure the delivery of each sheaf to the feeders 77.

The drag chains 80 are driven by sprockets mounted on the shaft 83, which latter is driven through the gearing 84, from the shaft 11.

Connecting rods 85 extend from the feeders 77 to a crank shaft 86, as shown more clearly in Fig. 2, this crank shaft being operated by a crank arm 87 which carries a roller or pin engaging with a cylindrical cam 88, which is mounted on and driven by the shaft 11, the construction and operation of the parts just described being such that at each revolution of the shaft 11, the crank shaft 86 is oscillated, thereby drawing all of the feeders 77 toward the center of the machine and then returning them to the position shown in Fig. 3.

The shaft 11 also carries a cam 89, which operates the lever 75 of the packer 74, the lever 75 being provided with crank arm 90 (Fig. 1), which carries a roller in engagement with the groove of the cam 89. A connecting rod 91 extends to levers 75 and 76 to insure uniform motion between these levers. The construction and operation of the parts just described is such that as the cam 89 rotates, the packer 74 is raised to place the sheaf which it carries within the shock holding members 73.

Butt boards 92 are adjustably mounted on the forward shock holding members 73 and each sheaf after it is brought into proper position is pressed against these butt boards to insure the alinement of the bottoms of the sheaves forming a shock.

The rear shock holding members 73 are provided with spring metal frames 93 which are adjustably mounted on the members 73 and serve to yieldingly embrace the ends of the sheaves to hold the latter in close relation, one with another, so that the shock may be properly capped. These frames 93 are preferably composed of spring wire of sufficient strength to properly perform the functions above stated, and comprise horizontally arranged members which are fastened in the sockets of the members 73 and joined together at or nearly at their rear ends by a curved vertically arranged member, its curve being equal to the curve of the members 73.

The shock holding members 73, as more clearly shown in Fig. 3, are each provided with a sheaf retaining finger 94, these fingers being arranged to normally occupy the position shown, though being so mounted as to be capable of being swung upwardly and outwardly on their pivot to permit a sheaf to pass between the fingers 94, after which the springs 95 become effective to return the fingers 94 to their proper position.

As shown in Fig. 2, the packer 74 is slotted, as at 96 to permit it to pass the fingers 94 in its upward and forward stroke, so that should the packer be raised without having a sheaf upon it, the fingers 94 will not be moved to release a sheaf which may have previously been placed in the shock holding members.

As shown more clearly in Fig. 3, the lower ends of the left hand members 73 are formed, as guards 96 and supplementary sheet metal guards 97 extend therefrom to the members 73, thereby presenting a smooth surface to the sheaves of grain in their travel to the packer, and preventing the possibility of the grain being caught upon the fingers 94, or the springs 95. The right hand members 73 are carried downwardly into a position as shown at 98 to form an abutment which the entering sheaves of grain cannot pass, thereby insuring that each sheaf will come to rest upon the packer.

A shaft 99, Figs. 1–3, is journaled above the frame at the right of Fig. 3 and is driven through bevel gear 100 (Fig. 2) and carries a crank 101 at its rear end, the latter being connected through the connecting rods 102 and 103 to the cranks 104 and 105, the latter being mounted on the rear ends of the crank shafts 72 and 71 respectively. The construction and operation of the parts just described is such that when the shaft 99 is given a half revolution from the position shown in Fig. 3 the members 73 are moved away from each other to release the shock, and when the shaft 99 is rotated the second half revolution, the members 73 are again brought to the position shown in Fig. 3.

Spur gearing 106 connects bevel gear 100 with a shaft 107 which is mounted above the shaft 99, the lower member of this spur gearing 106 being connected to the bevel gearing, which is in constant operation from the sprocket which is driven by the chain 10 previously described. The shaft 107 carries and drives bevel gearing 108 which operates a shaft 109, the latter carrying a cap sheaf feeding and pressing roller 110 (shown more clearly in Figs. 2 and 3).

Mounted immediately below the roller 110 is a similar roller 111 which is operated from the shaft 109 through the gearing 112.

The rollers 110 and 111 are both mounted free to slide upon their respective shafts and are operated by a cross-head 113 to which the operating rods 114 and 115 are attached, the operating rod 114 lying in the path of travel of a pin 116 carried on a multiplying lever 117 which is connected through the link 118 with the crank 101. The operating rod 115 lies in the path of travel of a pin 119 carried by one of the connecting rods 85 previously described.

In addition to the motion of the rollers 110 and 111 just described, these rollers also have a movement toward and from each other for the purpose of grasping the cap sheaf, and this motion is imparted to the upper roller 110 through the medium of a guide plate 120, (Figs. 2 and 3) this plate, as shown in Fig. 3, being provided with a groove 121 within which a pin carried by a portion of the cross-head 113 travels, the groove 121 being provided with a switch 122, the shape and arrangement of the groove and switch being such that when the rollers 110 and 111 are brought into position, as shown in Fig. 3, the pin on the cross-head 113 operates a portion at the top of the vertically arranged portion of the groove 121 whereupon the roller 110 may either fall by gravity or be pressed downwardly by spring pressure upon the roller 111, so that these rollers engage the cap sheaf to operate thereon.

As the rollers 110 and 111 are drawn away from the position shown in Fig. 3 the pin of the cross-head 113 travels in the upwardly inclined portion of the groove 121 until it passes the switch 122, which drops by gravity behind the pin, so that the next movement of the rollers toward the position shown in Fig. 3 causes a further separation of the rollers, due to the upwardly inclined portion of the groove 121 until the rollers have been separated and have reached their operating position, whereupon the pin has again reached the vertical portion of the groove 121 as previously described.

The upper end of the multiplying lever 117 is connected through a ball and socket connecting rod 123 to a sliding cap sheaf carrier which comprises the hub 124, upon which the collars 125 are mounted, each collar carrying a tine or arm 126, there being preferably four of such collars and arms.

The outside arms 126, as shown in Figs. 2 and 3, are preferably provided with tines or points 127 to assist in folding the cap sheaf over the sides of the shock during the operation of the machine, while the inside arms are preferably provided with pads 128, which present a comparatively large surface to the cap sheaf to assist in bending its ends over the shock.

The arms 126 preferably diverge, as shown in Figs. 2 and 3, to assist in spreading the upper portion of the cap sheaf as it is placed thereon by the rollers 110 and 111. The outer of the arms 126 are preferably arranged in a plane slightly above the inner arms to further assist in the proper positioning of the cap sheaf, as well as to prevent the latter from being disturbed during the travel of the machine and while the cap sheaf is in place upon the arms.

The hub 124 is arranged to slide upon a crank shaft 129 so that the cap sheaf carrier may be moved out of its normal position during the time when the shock is being deposited upon the ground, the connecting rod 123 and multiplying lever 117 and the link 118 being employed for the purpose of shifting the cap sheaf carrier along the crank shaft 129 which is preferably square or of such shape as to prevent the hub 124 from rotating thereon.

The crank shaft 129 is mounted for partial rotation, as more clearly shown in Fig. 1, where the crank shaft 129 is shown as journaled in a sliding block 130 and provided with a crank arm 131, to which a link 132 is attached, the link being connected to a lever 133 which is mounted upon the frame and extends forward to the timing mechanism to be presently described.

In addition to the motion just described for the crank shaft 129, it and the parts it carries may be shifted fore and aft with relation to the frame of the machine, through the medium of the transversely arranged crank shaft 134 and the links 135, the crank shaft 134 extending across the machine and being provided with means whereby it may be manually operated to shift the cap sheaf carrier to properly position it according to the length of the grain which is being handled by the machine.

If desired, the rollers 110 and 111 and their mechanism may be connected to the slide 130, as by the arm 136 (Fig. 1), so that as the cap sheaf holder is moved forward and backward the cap sheaf rollers will be moved, the pins 116 and 119 previously described being of sufficient length to permit the movement just described and still perform their functions with relation to the arms 114 and 115.

Figure 4:
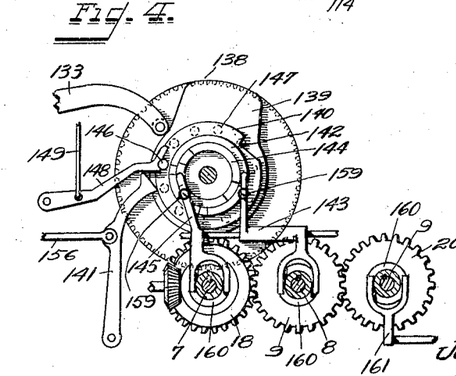
Fig. 4, Sheet 3, is an enlarged detail of the timing mechanism.

The gear 17 previously described as mounted on the shaft 7 carries a pinion 137 which drives a gear 138 forming part of the timing mechanism which is shown more clearly in Fig. 4.

On the same center therewith is a timing cam, which comprises the cam surface 139, the rise of which co-acts with the roller on the end of the lever 133; the cam surface 140, which co-acts with the upper end of the lever 141; the cam surface 142, which co-acts with the clutch shifter 143; the cam surface 144, which co-acts with the clutch shifter 145; and the clutch pin 146 which is adapted to engage pockets 147 formed in the side of the gear 138, the clutch pin 146 being operated by the arm 148.

The arm 148 is controlled, through the rod 149, by the arm 150 (Figs. 1, 2, and 3), the latter being pivoted as at 151 to the member 44 and provided as at 152 with a foot which is adapted to be operated by one of the sheaves which composes the shock, the foot 152 extending to and occupying a position within the area encompassed by the member 73 as more clearly shown in Fig. 3.

The upper end of the arm 150 is formed into a latch 153 which embraces the forward end of the member 45 to hold it and any load it may carry in proper position, the coil spring 154 exerting its tension to hold the latch 153 properly engaged, while the bolt 155 serves as a means for adjusting the position of the latch 153 and the foot 152.

Referring again to Fig. 4, the arm 141 is connected as by rod 156 to a lever 157 (Fig. 1) which controls a clutch shown diagrammatically at 158, the latter serving to connect or disconnect the shaft 99 with or from the gearing 100.

Referring again to Fig. 4, the clutch shifters 143 and 145 are held against the cam surfaces 142 and 144 by springs 159, these cam surfaces being on the hill and dale plan and having levels representing the neutral position of the driven members 160 of the clutches between the gears 12 and 18 and 13 and 19, the cam surfaces 142 and 144 also having levels corresponding to the engaged position of the clutch members 160 with the gears 12 or 18 and 13 or 19, the construction and operation of these parts being such that as the timing cam revolves the various clutches referred to are thrown into or out of engagement in their proper timed relation one with another.

A shifter 161 controls the clutch member 160 on the shaft 9 as shown in Fig. 4, the shifter 161 being operated by a crank arm 162 (Figs. 1 and 2), which in turn is operated by rod 163 the latter being connected to a latch 164 mounted upon a post 165 and adapted to engage the member 42 to hold the latter in the position shown in Fig. 1, a rope or cable or other suitable operating device 166 being connected to the latch 164 and extending to a point within convenient reach of the operator in such manner that at the proper time, the latch 164 may be disengaged from the member 42 and the clutch on the shaft 9, properly engaged to rotate said shaft in such direction that the arm 42, through the previously described connections, from the shaft 9 may be caused to travel rearwardly and downwardly, thereby bringing the finger 167, which is located near the lower end of the member 42 and connected thereto into operation to reverse the position of the clutch member 160 on the shaft 9 thereby raising the member 42 to its upright position, as shown in Fig. 1, the finger 167 being so arranged that it may strike a shifter 168 to cause the operation of the clutch 160. The reëngagement of the latch 164 with the member 42 will, through its previously described connections shift the clutch member 160 to its neutral position, thereby bringing the shaft 9 to rest until a subsequent operation.

It is, of course, evident that the shaft 32 may be provided with a telescoping joint similar to the joint shown on the shaft 34 should it be found that the proper operation of the mechanism requires this.

The arm 150 may be adjustably mounted as shown at 169 so that the latch 153 may be set to trip when the shock holding members contain the amount of grain which it is desired to form into one shock.

To counter-balance the weight of the shock, a spring 170 may be secured to the post 165 and to the member 43 as shown in Fig. 1.

Braces 171 may be secured to the post 165 to assist in maintaining this post in its proper position.

The ground wheel 2 is mounted on a shaft 172 (Figs. 2 and 3), which extends from the ground wheel 2 to the opposite side of the frame and a sufficient distance beyond this point to afford a means of attaching the machine to the binder and if desired any additional braces may be attached to the frame and to any suitable part of the binder to further complete the connection between the machine and the binder.

The operation of the machine is as follows:

The sheaves are delivered from the knotting mechanism of the binder onto the alining roller 79, this roller being provided with an internal ratchet 173 and pawl so arranged that the roller can only rotate to deliver its sheaves upon the sheaf platform 78 from which they are removed by the drag chains 80 and disposed in front of the feeder 77, by which they are transferred to the packer 74, the packer in turn elevating the sheaves to proper position between the shock holding members 73. The elevating movement of the packer is around the center of the levers 75 and 76 so that the sheaves on being raised are pressed against the butt boards 92 to properly aline the sheaves.

The continued operation of the feeders and packer fills the shock holding members 73 until the sheaves therein contact with the foot 152 of the arm 150, thereby raising the clutch finger 148 of the timing mechanism and setting this mechanism in motion with the result that the forward end of the arm 133 is raised, thereby depressing the rear end of this arm and through the connections previously described raising the cap sheaf holder 126 to press the cap sheaf upon the grain end of the shock.

Immediately after the raising of the cap sheaf holder as previously described the clutch 160 of the shaft 7 is engaged to rotate the shaft 24 and, through the gearing 25 and 26 and 27 operates the quadrant 28 to tilt the member 45 from a horizontal to a vertical position—the previous operation of the foot 152 releasing the latch 153—thereby bringing the arms 48 to a position in which they bear the proper relation to the members 73 whereupon the clutch 160 of the shaft 7 is disengaged while the clutch member 160 of the shaft 8 is engaged to cause the operation of the shaft 32 and the drum 36, thereby drawing the arms 48 together around the shock and causing the engagement of the latch 60 with the pin 61 whereupon the clutch 160 of the shaft 8 is reversed to release the tension on the cables 21, the latch 60 meanwhile holding the arms in their engaged position with relation to the shock. Immediately after the releasing of the tension on the cables 21 the arm 141 is operated by the cam 140 and through the connections previously described imparts a half revolution to the shaft 99 which opens the members 73 and moves the cap sheaf holder along its shaft 129 to a position outside of the line of travel of the descending shock in which position these parts remain until the shaft 99 is again rotated one-half turn.

The clutch 160 of the shaft 7 is then reengaged in the reversed position to again operate the members 45 back to horizontal position, as shown in Fig. 1. As the member 45 becomes reëngaged with the latch 153 the cam 144 shifts the clutch 160 of the shaft 7 to neutral position whereupon the pin 146 comes in contact with the clutch finger 148 and stops the timing mechanism, it having completed one revolution.

When the machine has traveled to a point where the operator desires to begin the formation of his windrows or has reached one thereof, the latch 164 is operated through the cable 166 and the operation of this latch, through the mechanism previously described in releasing the member 42 causes the engagement of the clutch 160 of the shaft 9 which, through the sprocket 38 and the gearing to which it is connected moves the members 42 and 43 rearwardly and downwardly to deposit the shock upon the ground. When the discharging position of the shock handling members 48 has been reached the slack in the connection 62 will have been taken up by the movement of the parts whereupon the latch 60 will be disengaged from the pin 61 and the springs 56 become effective to separate the arms 48 from the shock whereupon the finger 167 will reverse the position of the clutch 160 of the shaft 9 and, through its gearing and connections elevate the members 42 and 43 to the position shown in Fig. 1 and cause the reëngagement of the latch 164 with the member 42 and the movement of the clutch 160 of the shaft 9 to neutral position.

During its downward movement the pin 174 becomes engaged with the arm 175, and on its return movement causes the reëngagement of the clutch 158 which imparts to the shaft 99 its second one-half turn, thereby restoring the cap sheaf holder and the shock holders to receiving position and starting the revolution of the shaft 11. The half revolution of the shaft 99 just described brings the rollers 110 and 111 to the position shown in Figs. 2 and 3, and causes them to engage the sheaf which is resting upon the packer 74, this sheaf having been placed thereon by the last movement of the feeders 77. When the timing mechanism was starting its action as previously described, the gripping of the rollers 110 and 111 upon the sheaf serving to feed it rearwardly and pressing it to proper form for a cap sheaf, the rollers being either held together by gravity or forced together by any suitable spring mechanism. The continued rearward movement of the cap sheaf brings it upon the cap sheaf holding arms 126 which, owing to their divergent arrangement, further spread the cap sheaf to proper condition for application to the shock.

The starting of the motion of the feeders, through the pin 119 and arm 115 moves the cap sheaf rollers 110 and 111 along their shafts to a position to the right of the travel of the sheaves when viewed from the rear, the construction and arrangement of these parts being such that the first sheaf which is handled is formed into the cap sheaf and that the first stroke of the feeders after the formation of the cap sheaf moves the feed rollers out of operating position where they remain until the next succeeding operation of the shock handling mechanism, after which the rollers are again brought into operating position by the movement of the cap sheaf carrier 126.

It is of course, evident that in localities where there are material variations in the amount of grain in the field, it may be desirable to vary the speed of the packing and feeding mechanism in which case only suitable form of varying speed mechanism may be incorporated in connection with the shaft 11, such as by changing the size of the sprockets employed or using a combination of other form of gearing which may, if desired be arranged to be operated while the machine is in motion.

It frequently happens that the grain in one part of the field will be of greater length than the grain in another part of the field and to this end it is desirable that the cap sheaf carrier be adjustable toward and from the shock of grain and this adjustment may be accomplished during the operation of the machine by means of the crank shaft 134 which, through its connections shifts the crank shaft 129 forward and backward with relation to the machine to bring the cap sheaf holder to any desired position with relation to the shock.

To assist in properly placing the cap sheaf the tines 127 are placed on the sides of the outer members 126 so that the tines of one member face those of the other in such manner that as the cap sheaf is placed upon the shock a few of the straws on each side will be drawn over the heads of the grain of the shock a sufficient distance to properly cap the same.

A set of tines 176 may be mounted upon a cross-bar 177 and the latter adjustably connected as by links 178 to the members 48 in such manner that as the members 48 are drawn together around the shock the tines 176 will be placed thereinto.

As the arms 48 descend to gripping position the cap sheaf holder 65 and its tines 70 engage the cap sheaf to properly hold it in position during the time the shock is carried by these arms 48.

Having thus fully described my invention, I claim:

1. In a shock forming machine the combination of shock holding members adapted to receive and hold sheaves to form a shock, means for introducing sheaves to said shock holding members, shock handling members for removing the shock from the shock receiving members and depositing it upon the ground, and means for placing a cap sheaf upon the shock.

2. In a shock forming machine the combination of shock holding members for holding the sheaves to form a shock, shock handling members for removing the shock from the holding members and depositing it upon the ground, means for operating said shock holding members to release the shock when said shock handling members become operative, means for returning said shock holding members to holding position after the operation of the shock handling members, and means for forming and placing a cap sheaf upon the shock.

3. In a shock forming machine the combination of shock holding members, a packer for introducing sheaves to said shock holding members to form the shock, means for delivering sheaves to said packer, shock handling members for removing the shock from the holding members after the same has been formed, means for operating said shock handling members to cause the latter to grasp the shock and deposit it upon the ground, and means for releasing said shock holding members during the operation of said shock handling members.

4. In a shock forming machine the comzination of shock holding members, a packer for introducing sheaves between said shock holding members to form a shock, feeders for said packer, means for delivering sheaves to said feeders, shock handling members for removing the shock from said shock holding members and depositing it upon the ground, and means for releasing said shock holding members during the operation of said shock handling members.

5. In a shock forming machine the combination of shock holding members, means for introducing sheaves between said shock holding members to form a shock, shock handling members for removing the shock from said holding members and depositing it upon the ground, and means controlled by the size of the shock between the shock holding members for causing the operation of said shock handling members.

6. In a shock forming machine the combination of shock holding members, a packer for introducing sheaves into said shock holding members to form a shock, sheaf holding fingers to retain the sheaves between the shock holding members after the operation of the packer, means for delivering sheaves to said packer, shock handling members for removing the shock from said holding members and depositing it upon the ground, a tripping device for causing the operation of the shock handling members and operated by the sheaves of the shock, and means for releasing the shock holding members during the operation of the shock handling members.

7. In a shock forming machine the combination of shock holding members, a packer for introducing sheaves between said shock holding members and exerting pressure thereon to completely fill the same, butt boards for alining the ends of the sheaves, means for delivering sheaves to said packer, shock handling members for removing the shock from the holding members and depositing it upon the ground, tines carried by said shock handling members for maintaining the alinement of the butts of the sheaves, means for operating said shock handling members to grasp and release the shock, and means for releasing said holding members during the operation of the said handling members.

8. In a shock forming machine the combination of shock holding members, butt boards carried thereby, a packer having a movement toward said shock holding members and toward said butt boards and for introducing sheaves to said holding members and placing them against said butt boards, means for delivering sheaves to said packer, shock handling members for removing said sheaves from said shock holding members and depositing it upon the ground, a trip operated by the size of the shock within the shock holding members for causing the operation of the shock handling members, and clutch controlled gearing connected to said shock holding members for operating the same and set in motion by said trip.

9. In a shock forming machine the combination of shock holding members arranged to receive and hold a shock in horizontal position, a packer for placing the sheaves within the shock holding members, means for feeding sheaves to the packer, shock handling members for grasping the shock and elevating it from its horizontal to a vertical position and then depositing it upon the ground, means controlled by the size of the shock for causing the operation of the shock handling members and means for releasing said shock holding members when said shock handling members become operative.

10. In a shock forming machine the combination of shock holding members, means for introducing sheaves to said members to form a shock, means for forming one of said sheaves into a cap sheaf, means for applying said cap sheaf to the shock held by the shock holding members, and shock handling members for removing the shock and the cap sheaf from the machine and depositing it upon the ground.

11. In a shock forming machine the combination of shock holding members to form a shock, means for forming sheaves into a cap sheaf, a carrier for receiving the cap sheaf, mechanism for operating said carrier to place the cap sheaf upon the shock within the shock holding members, and shock handling members for removing the capped shock from the shock holding members and depositing it upon the ground.

12. In a shock forming machine the combination of shock holding members, means for introducing sheaves to said members to form a shock, cap sheaf forming and feeding mechanism, a carrier for receiving the cap sheaf from said mechanism, means of operating said carrier to place the cap sheaf upon the shock within the shock holding members, shock holding members for removing said capped shock from said shock holding members and depositing it upon the ground, and means for moving said cap sheaf carrier out of the path of travel of the shock when the latter is being deposited upon the ground.

13. In a shock forming machine the combination of shock holding members, means for introducing sheaves thereto to form a shock, a carrier for receiving a cap sheaf, means for forming and delivering sheaf to said carrier, means for operating said carrier to place the cap sheaf upon the shock, shock handling members comprising in part a cap sheaf holder, means for operating said members to grasp the capped shock and remove it from the shock holding members, means for operating the shock holding members to release the shock during the operation of the shock handling members, means for moving the shock handling members to deposit the shock upon the ground, and means for moving the cap sheaf carrier out of the path of travel of the shock when it is being deposited upon the ground.

14. In a shock forming machine the combination of shock holding members, means for delivering sheaves thereto, means for forming a sheaf into a cap sheaf, means for placing the cap sheaf upon the shock, shock handling members, gearing connected for operating all of the above mentioned parts, clutches in said gearing, trip adapted to be operated by a portion of the shock, and a timing device set in motion by said trip for controlling the clutches in said gearing to properly time the operation of said clutches and the movements of the parts of the machine.

15. In a shock forming machine the combination of shock holding members, means for introducing sheaves thereinto, a sheaf alining mechanism for delivering the sheaves to the sheaf introducing means, and shock handling and depositing members for placing the formed shock upon the ground.

16. In a shock forming machine the combination of shock gripping and depositing members, means for causing these members to grip a shock, tines carried by the members, and yielding strippers for the tines.

17. In a shock forming machine the combination of shock forming mechanism, shock handling and depositing arms, shock engaging tines carried by the arms, strippers for the tines and means for moving the arms to shock engaging position and releasing them to deposit the shock.

JOHN L. CULKIN.